United States Patent
Zolotusky, Jr. et al.

(10) Patent No.: US 10,671,635 B2
(45) Date of Patent: Jun. 2, 2020

(54) DECOUPLED CONTENT AND METADATA IN A DISTRIBUTED OBJECT STORAGE ECOSYSTEM

(71) Applicant: Hitachi Vantara Corporation, Santa Clara, CA (US)

(72) Inventors: Vitaly Zolotusky, Jr., Arlington, MA (US); Kevin Scott Grimaldi, Gardner, MA (US); Benjamin Isherwood, Tewksbury, MA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 563 days.

(21) Appl. No.: 14/438,919

(22) PCT Filed: Feb. 27, 2013

(86) PCT No.: PCT/US2013/027870
§ 371 (c)(1),
(2) Date: Apr. 28, 2015

(87) PCT Pub. No.: WO2014/133497
PCT Pub. Date: Sep. 4, 2014

(65) Prior Publication Data
US 2015/0293984 A1 Oct. 15, 2015

(51) Int. Cl.
*G06F 16/27* (2019.01)
*H04L 29/08* (2006.01)
(Continued)

(52) U.S. Cl.
CPC .............. *G06F 16/27* (2019.01); *G06F 3/065* (2013.01); *G06F 3/0617* (2013.01);
(Continued)

(58) Field of Classification Search
CPC ................................ G06F 17/304; G06F 16/27
See application file for complete search history.

(56) References Cited

U.S. PATENT DOCUMENTS

| 7,428,621 B1 * | 9/2008 | Todd | G06F 16/164 711/161 |
| 2006/0272028 A1 * | 11/2006 | Maes | G06Q 30/04 726/27 |

(Continued)

OTHER PUBLICATIONS

Chinese Office Action received in corresponding Chinese Application No. 201380062151.3 dated May 26, 2017.
(Continued)

*Primary Examiner* — Van H Oberly
(74) *Attorney, Agent, or Firm* — Mattingly & Malur, PC

(57) ABSTRACT

A storage system comprises: a controller; a memory; one or more objects, each object having content data and metadata which includes system metadata; and a policy which governs writing of the content data and metadata of the one or more objects from the storage system to an external storage. The policy includes a configurable criterion for decoupling of the content data and the metadata of a given object and a rule for determining storage locations for the content data and the metadata between the storage system and the external storage in a decoupled manner if the content data and the metadata of the object are decoupled. The configurable criterion is based on an attribute of the metadata of the object. The controller is operable to execute the policy against the objects and to apply the rule to determine storage locations for the content data and metadata of a decoupled object.

20 Claims, 7 Drawing Sheets

(51) Int. Cl.
*G06F 3/06* (2006.01)
*G06F 16/182* (2019.01)

(52) U.S. Cl.
CPC ........ *G06F 3/0685* (2013.01); *G06F 16/1844* (2019.01); *H04L 67/1097* (2013.01)

(56) References Cited

U.S. PATENT DOCUMENTS

| | | |
|---|---|---|
| 2007/0038822 A1 | 2/2007 | Correl |
| 2007/0294310 A1 | 12/2007 | Yagawa |
| 2008/0098044 A1* | 4/2008 | Todd ..................... G06F 16/273 |
| 2009/0249005 A1* | 10/2009 | Bender ............... G06F 11/1435 |
| | | 711/162 |
| 2010/0205154 A1* | 8/2010 | Beliczynski .......... G06F 16/162 |
| | | 707/665 |
| 2011/0055178 A1 | 3/2011 | Mark |
| 2011/0055494 A1 | 3/2011 | Roberts et al. |
| 2012/0150930 A1 | 6/2012 | Jin et al. |
| 2012/0173596 A1 | 7/2012 | Slik et al. |
| 2012/0226712 A1* | 9/2012 | Vermeulen .......... H04L 67/1097 |
| | | 707/770 |
| 2014/0181935 A1* | 6/2014 | Beckmann .............. H04L 63/10 |
| | | 726/7 |

OTHER PUBLICATIONS

Extended European Search Report received in corresponding European Application No. 13876618.3 dated Sep. 7, 2016.
Communication Pursuant to Article 94(3) EPC received in corresponding European Application No. 13 876 618.3 dated Jun. 25, 2019.

* cited by examiner

DECOUPLED CONTENT AND METADATA IN A DISTRIBUTED OBJECT STORAGE ECOSYSTEM

BACKGROUND OF THE INVENTION

The present invention relates generally to storage systems and, more particularly, to the decoupling of content and metadata for storage in a distributed object storage ecosystem.

With the growth of unstructured non-mutable digital content, it is becoming increasingly difficult to manage and locate relevant digital content. To find relevant content, the data about the digital content (i.e., metadata) is becoming more important than the digital content itself. For traditional object storage systems in a distributed environment (distributed object storage ecosystem), both the digital content and the metadata are stored together in multiple locations to achieve both disaster recovery and locality of reference. This is achieved by utilizing replication technology to ensure copies are distributed to remote sites. Another drawback of the traditional systems is that they apply the same rules of storage to both data and metadata. For example, if an object is stored in N copies on the low latency storage system, all N copies contain both data and metadata even though the data part might not be needed at all in some locations/applications.

Because companies are becoming more geographically dispersed with many separate offices and even data centers, the replication topologies required to provide locality of reference for all digital content becomes more complex and the storage requirements for the digital content are multiplied by the number of local references required. When the primary goal is to have locality of reference for the metadata only, this means that the digital content for the metadata is stored in multiple locations unnecessarily. Data replication is also a very time consuming procedure and replication of both data and metadata creates considerable time delays, replication backlog, and unnecessary bandwidth consumption.

BRIEF SUMMARY OF THE INVENTION

Exemplary embodiments of the invention provide an intelligent object that utilizes user definable rules and its intelligence to identify which objects in the distributed object storage systems should maintain copies of the non-mutable digital content and metadata, and which should only contain metadata, while still maintaining accessibility to the digital content, data protection, and disaster recovery capabilities across the whole environment. In the event that the digital content is required by any object storage system that is only hosting the metadata, it would be retrieved from the other objects storage systems as if a local copy were always available. With this solution, remote locations can host smaller capacity object storage systems that will store metadata only but provide full access to the set of digital content and metadata stored in a larger object storage system hosted in a central data center. This solution provides better capacity utilization with the same data access. Content ingest can be accomplished either via the remote location or the central data center, but the remote location will still only maintain the metadata-only view of the content when the central data center has stored the digital content. It should be noted that this invention does not limit where the metadata-only configuration is allowed. It could be on the system for which the content was ingested or some other system that may have the content replicated to it. The invention ensures that there is at least one copy somewhere in the ecosystem.

Method for separating the management lifecycle of the digital content from the metadata in an object storage system can also be used in the non-replication environment. The metadata will remain actively resident in the storage managed by the object storage system, but based on storage tiering policies, the digital content or additional copies of the content may be stored on another networked storage device. The digital content whether stored in the object storage system or on a different networked storage system will still be managed and accessible by any object storage system that contains the metadata for the object(s) by retrieving the object either from itself, if resident, or from the other networked storage device.

This mechanism creates intelligent content tiering that honors the data protection levels of the object storage system, efficient update, and indexing of system and custom metadata of objects, as well as providing options of compressing and encrypting the data moved to network storage devices.

In accordance with an aspect of the present invention, a storage system comprises: a controller; a memory; one or more objects, each object having content data and metadata which includes system metadata; and a policy which governs writing of the content data and metadata of the one or more objects from the storage system to an external storage. The policy includes a configurable criterion for decoupling of the content data and the metadata of a given object and a rule for determining storage locations for the content data and the metadata between the storage system and the external storage in a decoupled manner if the content data and the metadata of the object are decoupled. The configurable criterion is based on an attribute of the metadata of the object. The controller is operable to execute the policy against the one or more objects of the storage system, which includes evaluating the metadata of each object as a candidate object to be written in the decoupled manner based on the configurable criterion; and, when the content data and the metadata are decoupled for a decoupled object, to apply the rule to determine storage locations for the content data and the metadata of the decoupled object.

In some embodiments, the configurable criterion is based on an attribute of the system metadata of the object. Executing the policy includes evaluating the system metadata of each object as a candidate object to be written in the decoupled manner based on the configurable criterion. The controller is operable to run a schedulable service periodically to identify objects from the storage system as candidate objects to be written in the decoupled manner and to execute the policy against the identified objects.

In specific embodiments, the controller is operable: when the rule of the policy determines that the storage location for the content data is the external storage, to verify that the object is written to the external storage, verify that the content data is stored in the external storage, and when both are verified, remove the content data from the storage system and record in the storage system that the external storage is a location of the content data of the object that was written; and when the rule of the policy determines that the storage location for the content data is the storage system, to verify that the object is to be written as metadata only to the external storage, verify that the content data of the object is stored in the storage system, and when both are verified, write the metadata of the object to the external storage and send a pointer to the external storage, the pointer pointing to a location of the content data of the object in the storage system.

In some embodiments, when the rule of the policy determines that the storage location for the content data is the external storage, the controller is operable: to remove the content data from the storage system after a first preset amount of time specified by the rule of the policy, the first preset amount of time being equal to or greater than zero; and after retrieving the content data from the external storage, to keep the retrieved content data in the storage system for a second preset amount of time specified by the rule of the policy, the second preset amount of time being equal to or greater than zero.

In specific embodiments, the external storage is disposed in another storage system. The storage system and said another storage system are part of a plurality of storage systems networked together to replicate objects among the storage systems in a replicated environment.

Another aspect of the invention is directed to an apparatus for managing writing of objects between storage systems, wherein each object has content data and metadata which includes system metadata. The apparatus comprises a controller and a memory. The controller is operable to: execute a policy against one or more objects of a source storage system, the policy governing writing of the content data and metadata of the one or more objects from the source storage system to a target storage system, the policy including a configurable criterion for decoupling of the content data and the metadata of a given object and a rule for determining storage locations for the content data and the metadata between the source storage system and the target storage system in a decoupled manner if the content data and the metadata of the object are decoupled, wherein the configurable criterion is based on an attribute of the metadata of the object, wherein executing the policy against the one or more objects includes evaluating the metadata of each object as a candidate object to be written in the decoupled manner based on the configurable criterion; and, when the content data and the metadata are decoupled for a decoupled object, apply the rule to determine storage locations for the content data and the metadata of the decoupled object.

Another aspect of this invention is directed to a method for managing writing of objects, wherein each object has content data and metadata which includes system metadata. The method comprises: executing a policy against one or more objects of a storage system, the policy governing writing of the content data and metadata of the one or more objects from the storage system to an external storage, the policy including a configurable criterion for decoupling of the content data and the metadata of a given object and a rule for determining storage locations for the content data and the metadata between the storage system and the external storage in a decoupled manner if the content data and the metadata of the object are decoupled, wherein the configurable criterion is based on an attribute of the metadata of the object, wherein executing the policy against the one or more objects includes evaluating the metadata of each object as a candidate object to be written in the decoupled manner based on the configurable criterion; and, when the content data and the metadata are decoupled for a decoupled object, applying the rule to determine storage locations for the content data and the metadata of the decoupled object.

These and other features and advantages of the present invention will become apparent to those of ordinary skill in the art in view of the following detailed description of the specific embodiments.

DETAILED DESCRIPTION OF THE INVENTION

Figure 1:
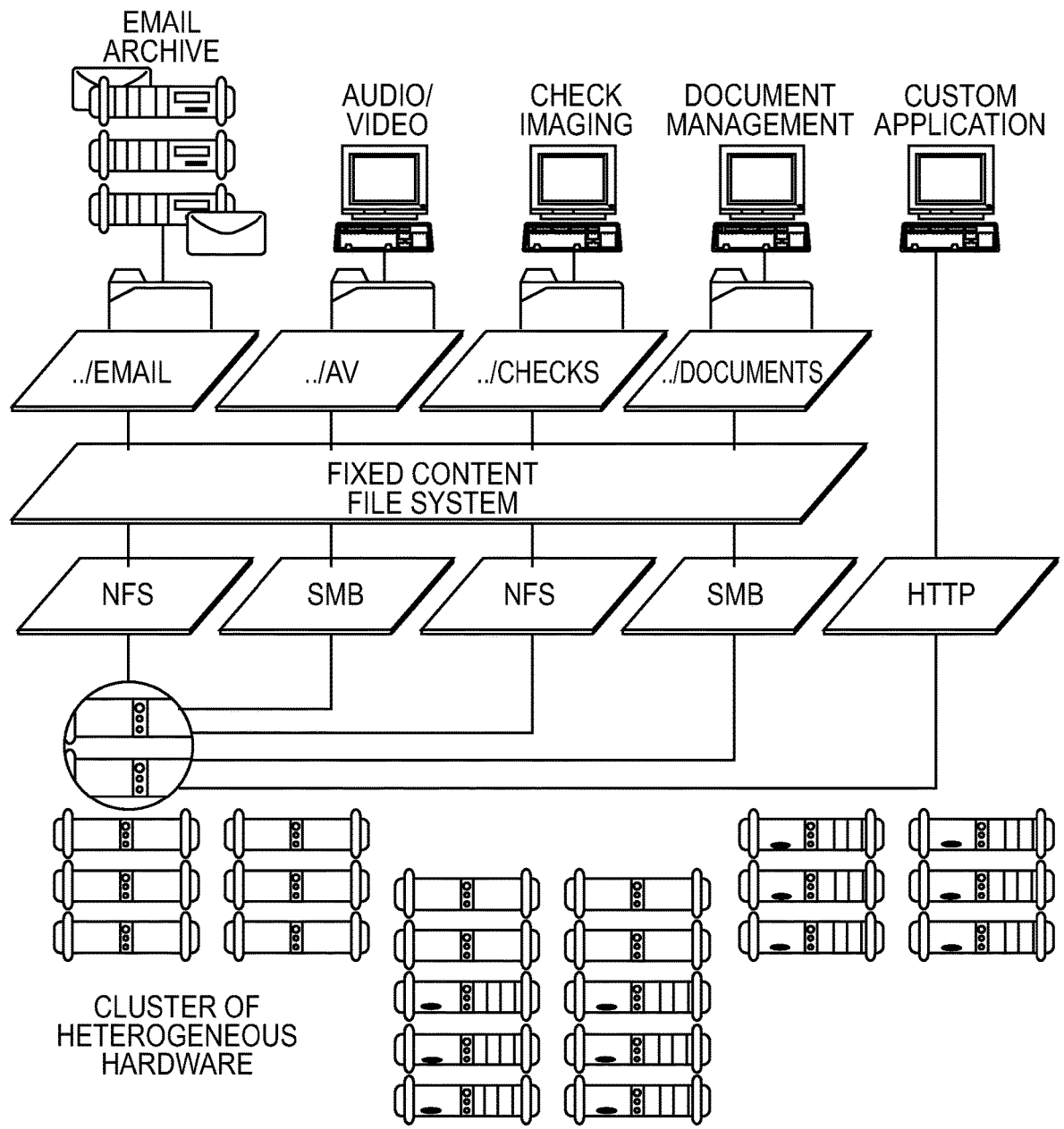
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for decoupling content and metadata for storage in a distributed object storage ecosystem.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
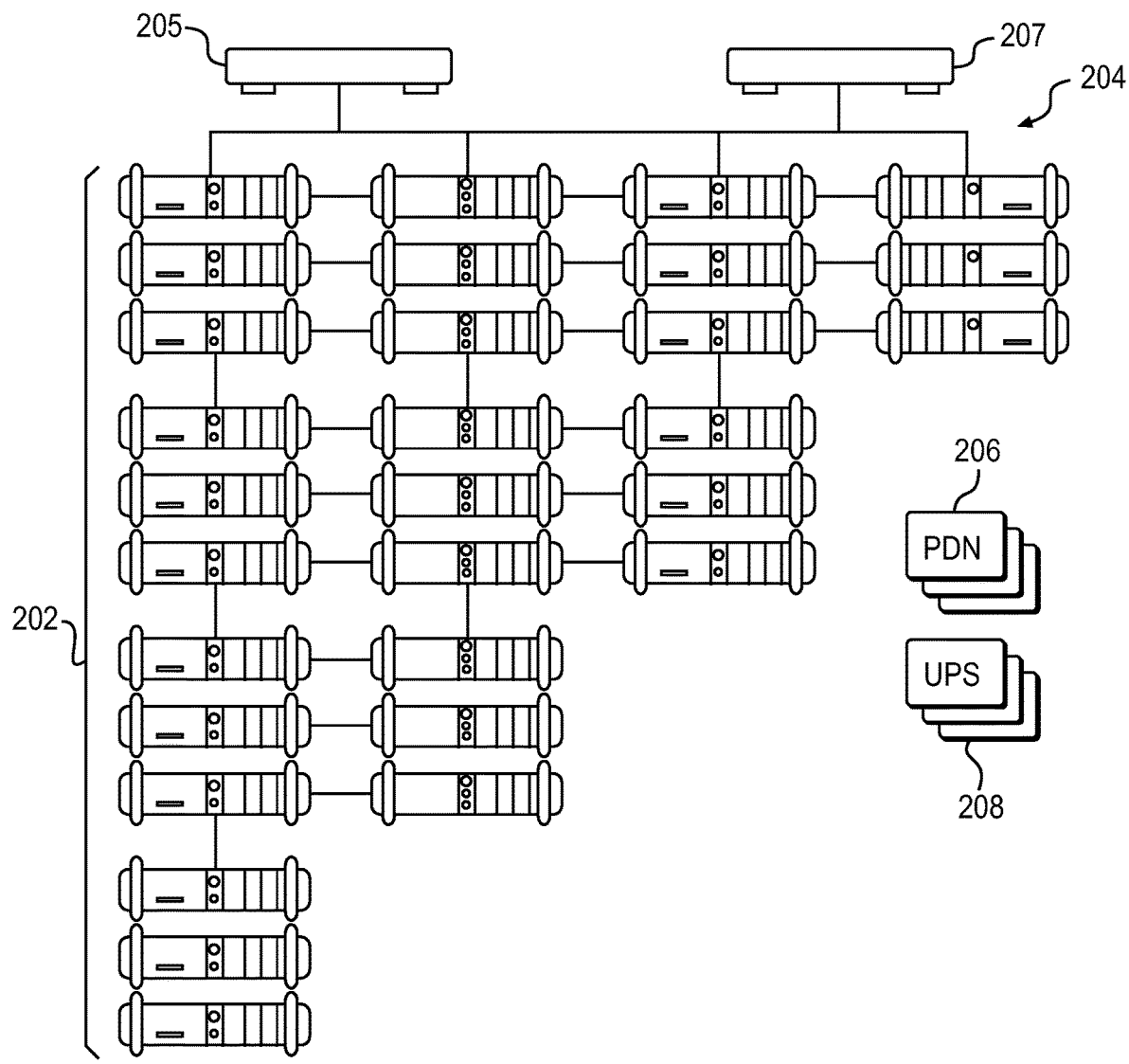
FIG. 2 is a simplified representation of a redundant array of independent nodes each of which is symmetric and supports an archive cluster application.

As described in commonly owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., CPU, suitable random access memory (RAM), one or more hard drives (e.g., standard IDE/SATA, SCSI, or the like), and two or more network interface (NIC) cards. A typical node is a 2 U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or GigE switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API (Application Program Interface), or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
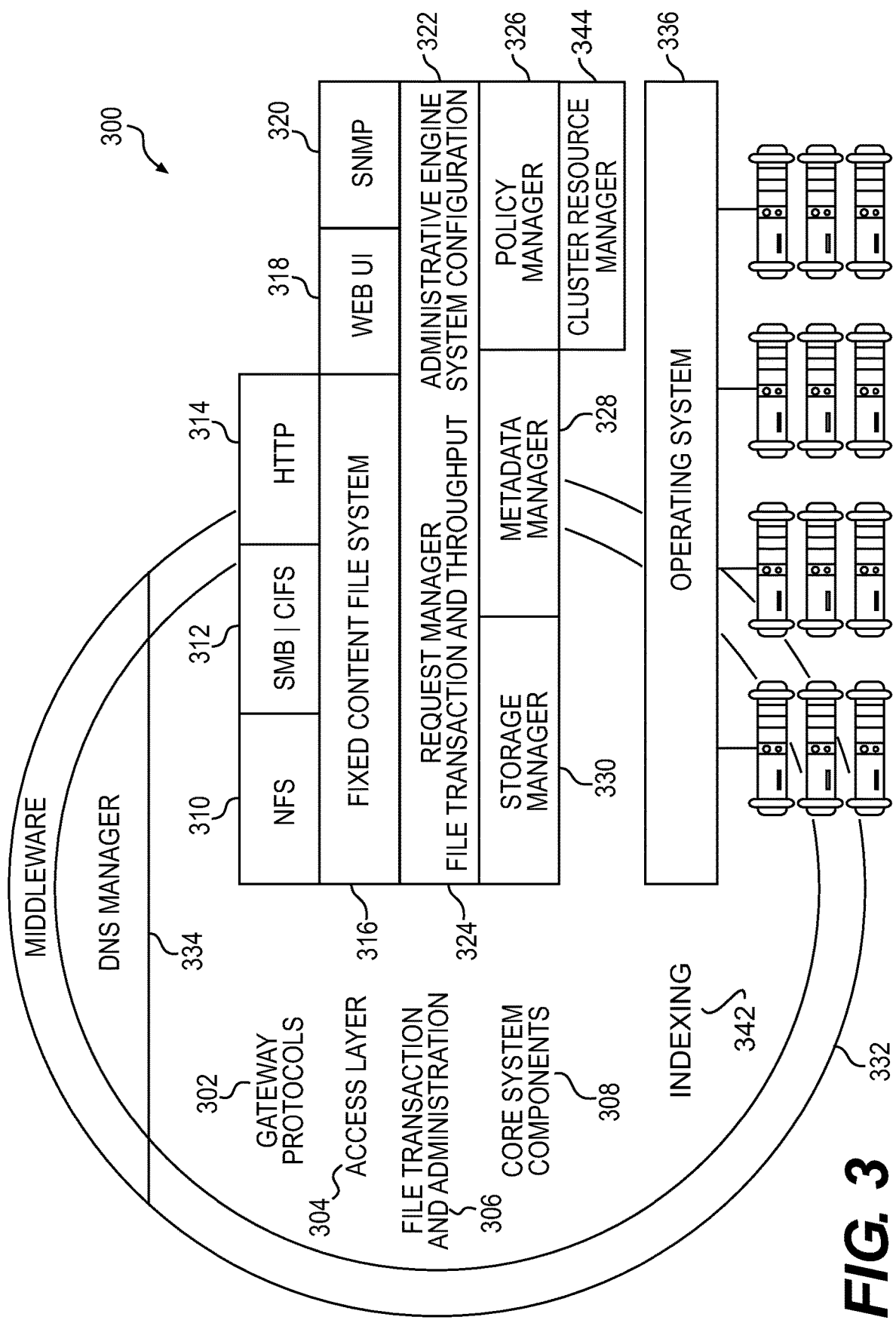
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application instance executes on a base operating system 336, such as Linux, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A clusters primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

ExternalFile: a file as perceived by a user of the archive;

InternalFile: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6$=64 regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object . . . .

As used herein, a namespace is a logical partition of the cluster, and essentially serves as a collection of objects particular to at least one defined application. Each namespace has a private file system with respect to other namespaces. Moreover, access to one namespace does not grant a user access to another namespace. A cluster/system of nodes is a physical archive instance. A tenant is a grouping of namespace(s) and possibly other subtenants. Top-Level Tenant (TLT) is a tenant which has no parent tenant, e.g., an enterprise. Subtenant is a tenant whose parent is another tenant; e.g., the enterprise's financing department. Default Tenant is the top-level tenant that contains only the default namespace. A cluster/system is a physical archive instance. See US2011/0106802, which is incorporated herein by reference in its entirety.

Figure 4:
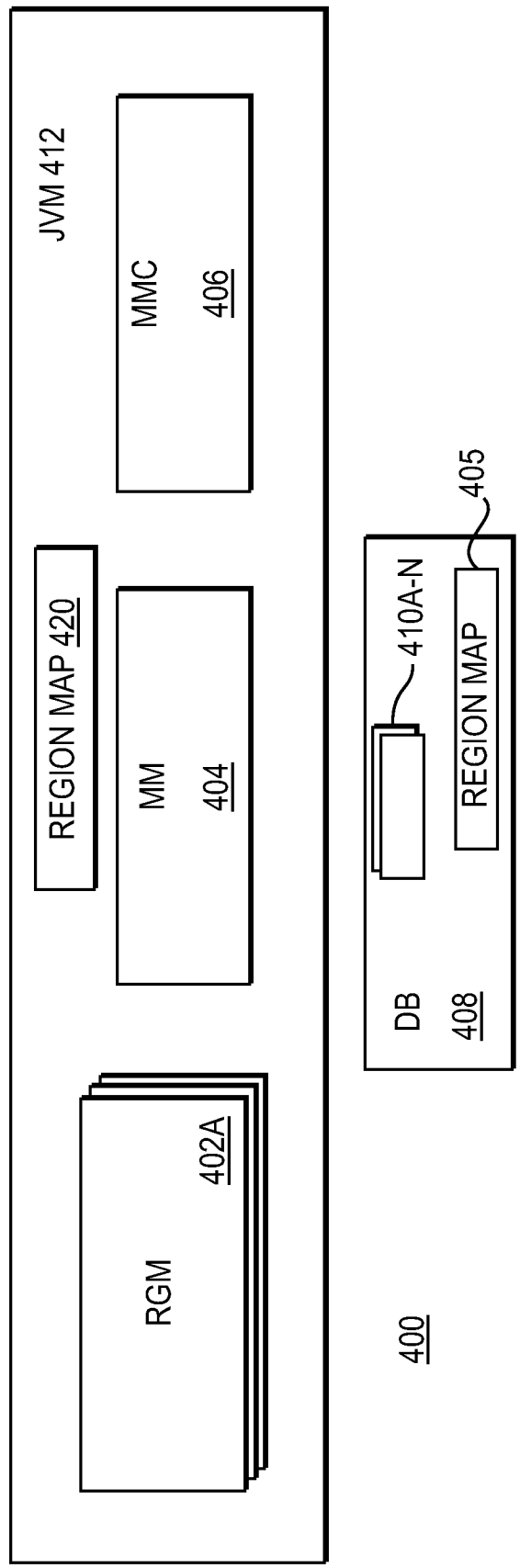
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RG Ms are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Pat. No. 7,657,581.

III. Intelligent Content Tiering With Decoupled Content and Metadata

The method of separating the management lifecycle of static digital content (i.e., fixed-content data) and its metadata is the core of this feature of intelligent content tiering. This method enables the distributed storage system to intelligently decide which individual storage system should contain the static digital content along with its metadata and which individual storage systems should contain only the metadata for the digital content.

There are two main elements of the implementation. First, the user of the system is given the ability to create a set of rules that will govern the behavior of the objects in relation to storage locations for the static digital content and its metadata. This ability is provided by creating a "Service Plan" or a policy and assigning it to a collection of objects. Second, a schedulable service (e.g., a storage tiering service) periodically runs to identify candidate objects, executes the configured Service Plan against the selected candidates collection, and applies the rules defined by the user.

In the Service Plan or policy, a configurable criterion for decoupling the content from the metadata for an object is based on some attribute of the metadata, more specifically the system metadata in specific embodiments, of that object. The system metadata is the core information about the object such as creation date, size, number of copies, whether it has been replicated, etc. Examples of the criterion include whether the object has been replicated to another system, whether there is another copy of the object within a given content platform system, the content has not been accessed for a certain amount of time, etc. Therefore, the policy may be set up, at least in part, based on an attribute of the system metadata of the object to be replicated. To execute the policy against a candidate object, the storage tiering service evaluates the system metadata of the candidate object based on a configurable criterion.

Usage of this implementation has two main use cases utilizing the Service Plan for separating data and metadata lifecycles used in the system: (1) replication environment including multiple storage systems, and (2) individual storage system with external storage volumes.

III. A Replicated Environment

A replicated environment can have multiple systems for the purpose of providing data protection utilizing multiple systems. A replicated environment includes source and target systems for data content. In a simple replication topology, there will be one source, but potentially multiple target systems. With more complete chained replication topologies, what is the source and what is the target will depend on the context within the topology. For instance, in a 3-system chained topology where systems are constructed serially, the system at the end of the chain considers the system in the middle of the chain its source. Furthermore, the middle system in the chain considers the first system in the chain as its source.

In a replicated environment, one purpose of this invention is for intelligent lifecycle management of static digital content and metadata parts of the object to: (a) minimize redundancy in data storage; and (b) minimize unneeded data transfers. A service plan may be defined on either the source or target system(s) to define the following behavior: (a) keep only metadata after T1 amount of time has elapsed since ingest; and (b) on reads, rehydrate objects and keep for T2 amount of time.

When a request for an object is made, servicing user read requests for objects includes the following:
1. If the user requests only the metadata portion of the object, it is retrieved locally and serviced to the user without going to the remote system.
2. If the fixed digital content of the object is needed on the system that does not have it locally, this digital content will be retrieved transparently from the source or target, and returned to the user.

3. If the value T2 (e.g., keep for T2 days on rehydrate) is defined and is greater than 0, the system that did not have digital data content will store this content locally for T2 amount of time. This will enable the user to retrieve the static digital content locally until T2 time has expired. A service run that happens after T2 time has elapsed will remove the local static digital content. Remote content will not have to change at all.

The following are two use cases for different replication topology contexts.

In Use Case 1, the service plan with metadata only feature is defined for the object on a source system in a replication topology. On the first service run after T1 time has elapsed after the ingest of the object, the tiering service will:
1. Verify that the object is replicated to a target system in the replication topology.
2. Verify that on the target system, data portion of the object is safely stored and is not requested to be stored as Metadata Only on the target system.
3. If both conditions are met, the data portion for the object is marked for removal and the location of the data portion on the target system is recorded on the source system.

After Service Plan completion, the source system will have metadata only stored locally with the data portion and metadata stored on the replica system.

Figure 5:
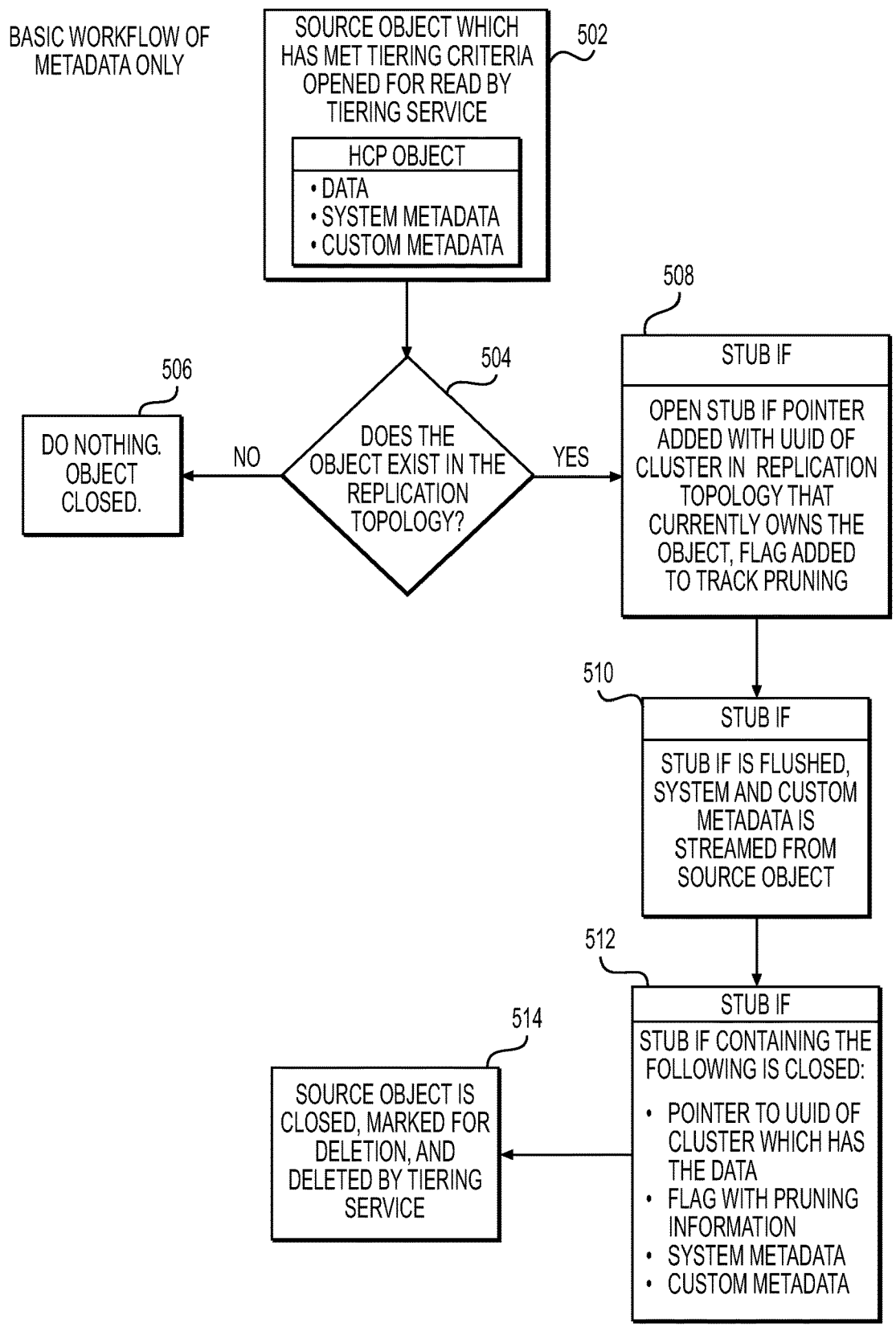
FIG. 5 shows an example of a flow diagram illustrating the tiering service process for Use Case 1 with metadata only feature defined for the object on the source system in a replication topology.

FIG. 5 shows an example of a flow diagram illustrating the tiering service process for Use Case 1 with metadata only feature defined for the object on the source system in a replication topology. The process starts with a source object that has met tiering criteria and is opened for read by the tiering service (step 502). In step 504, the tiering service determines whether the object exists in the replication topology. If no, the process stops and the object is closed (step 506). If yes, an Open Stub IF (Internal File) Pointer is added with UUID (Universally Unique Identifier) of cluster in the replication topology that currently owns the object and a flag is added to track pruning in step 508. In step 510, the Stub IF is flushed and the system and custom metadata is streamed from the source object. In step 512, the Stub IF containing the following is closed: pointer to UUID of cluster which has the data, flag with pruning information, system metadata, and custom metadata. In step 514, the source object is closed, marked for deletion, and deleted by the tiering service.

In Use Case 2, the service plan with metadata only feature is defined for the object on the target system in the replication topology. When the object is being processed on the replication queue on the source system, the replication service will:
1. Determine whether the object is a candidate for Metadata Only on the target system.
2. Verify that on the source system, data portion of the object is safely stored and is not requested to go Metadata Only.
3. If both conditions are met, only metadata portion of the object is sent to the target system along with a pointer to the location of the data portion on the source system instead of replicating full data.

After Service Plan completion, the target system will have metadata only stored locally. Data portion will be stored on the source system.

III. B Individual Storage System with External Storage Volumes

Typical storage systems encompass and manage storage volumes internal to its system only. With this invention, the storage available from the primary storage system context will also include storage volumes exposed through other network technologies (e.g., NFS). It is necessary to construct policies and processes to determine when and where content should be stored on the external storage volumes.

In the context of an individual storage system with external storage volumes, the intelligent lifecycle management of static digital content and metadata parts of the object is used to: (a) optimize usage of low latency/high cost internal data storage, and (b) enable data storage on the external media, but still under content platform (e.g., HCP) management. The service plan could define the following behavior: (a) move one copy of the static digital content to external storage pool after T1 time has elapsed since ingest, and (b) on reads, rehydrate the static digital content and keep locally until T2 time has elapsed. The service plan definition will include the following configuration:
1. External volume definition for the storage specifying the network protocol specifics (e.g., the NFS share provided by an NFS server).
2. T1 amount of time until content should be stored on external volume.
3. Optional compression on data when written to external storage.
4. Optional encryption of data when written to external storage.

When the tiering service determines that an object is a candidate to be written to the external storage based on the service plan definition, the processing will include the following:
1. Verify that the object is replicated (if needed) and indexed (if needed).
2. Compress data going to the external volume, if requested.
3. Encrypt data going to the external volume, if requested.
4. Move static digital content of the object to the external volume.
5. Mark local copy of static digital content portion of the object for removal and record the location of the data portion on the external volume.

After this run, the source system will have only metadata stored locally. The fixed digital content portion will be stored on the external volume.

Servicing user read requests for objects that are stored on the external volume will involve the following:
1. If the user requests only the metadata portion of the object, it is retrieved locally and returned to the user without going to the external volume.
2. If the static digital content portion of the object is needed and the system does not have it locally, this digital content will be retrieved transparently from the external volume, uncompressed, decrypted, and presented to the user.
3. If the value T2 rehydration time is defined and is greater than 0, the system will store this content locally for T2 amount of time. This will enable the user to get data content locally for T2 elapsed time. A service run that happens after T2 elapsed time will remove local static digital content portion. Remote content stored on the external volume will not have to change at all.

Figure 6:
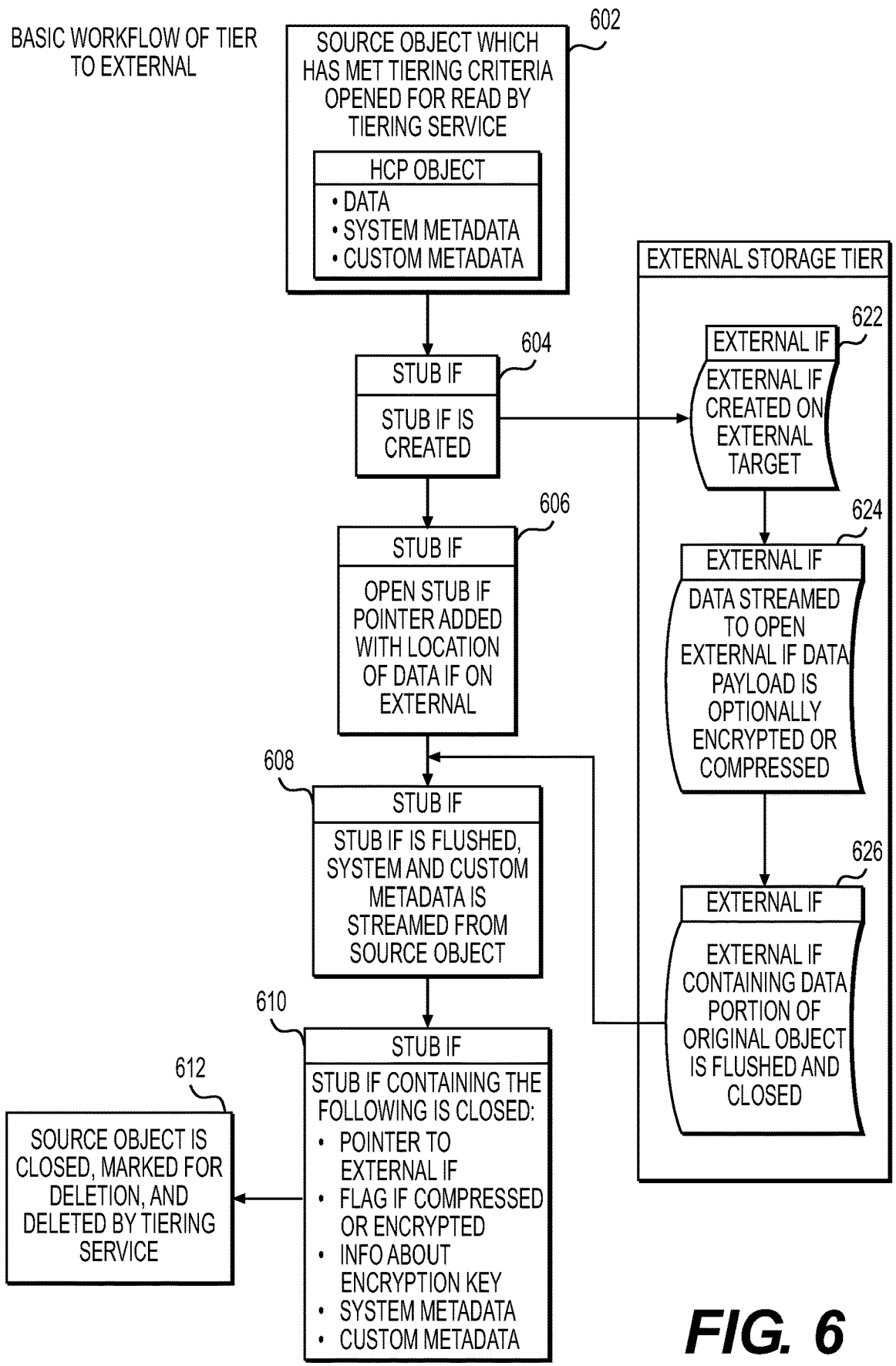
FIG. 6 shows an example of a flow diagram illustrating the tiering service process for external tiering to store metadata only locally and to store fixed digital content on the external volume.

FIG. 6 shows an example of a flow diagram illustrating the tiering service process for external tiering to store metadata only locally and to store fixed digital content on the external volume. The process starts with a source object that has met tiering criteria and is opened for read by the tiering service (step 602). In step 604, the Stub IF is created. In step 606, an Open Stub IF Pointer is added with location of data IF on external. Also, in the external storage tier, an External IF is created on the external target (step 622). The data streamed to open External IF data payload is optionally encrypted or compressed (step 624). The External IF containing data portion of the original object is flushed and closed (step 626).

Nest, the Stub IF is flushed and the system and custom metadata is streamed from the source object in step 608. In step 610, the Stub IF containing the following is closed: pointer to external IF, flag if compressed or encrypted, information about encryption key, system metadata, and custom metadata. In step 612, the source object is closed, marked for deletion, and deleted by the tiering service.

This intelligent content tiering mechanism with decoupled content and metadata creates intelligent content tiering that honors the data protection levels of the object storage system, efficient update, and indexing of system and custom metadata of objects, as well as providing options of compressing and encrypting the data moved to network storage devices.

Figure 7:
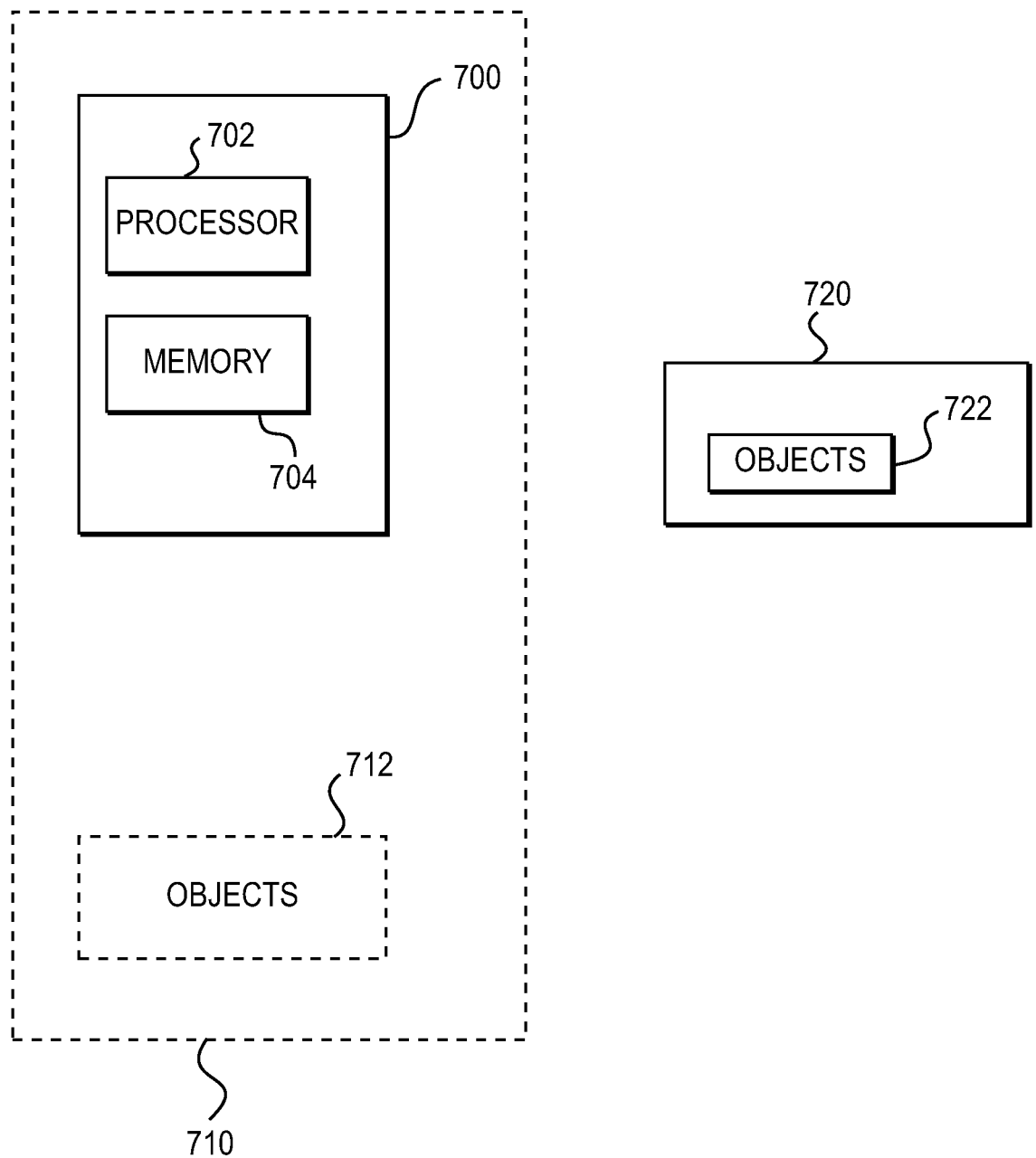
FIG. 7 shows an example of an apparatus for implementing the tiering service.

FIG. 7 shows an example of an apparatus for implementing the tiering service. The apparatus 700 may be part of an object system (710 shown in broken lines) where the objects (712 shown in broken lines) are stored, or part of a management computer separate from a system 720 (including an object system and an external storage) for storing the objects 722, or part of a system in a redundant array of independent nodes as described above (see FIGS. 1-4), or the like. The apparatus 700 includes a processor or controller 702 and a memory 704, and is operable to perform tiering service operations on the objects.

User Experience

The user experience on the system that implements these content tiering features does not change. The user stores the object on the system and defines all the familiar object parameters (how long the object has to live, how many copies of the object are desired, etc.). After that, for the duration of the object lifecycle, it stays available to the user. Additional properties for the object could be defined by the system administrator. These properties include two items: storage tier for the data part of the object or permission to store the data part on any other system in the topology.

Case 1: Metadata Only Objects With Data Sharing in Replicated Environment

Data storage and retrieval systems are used heavily in environments with various replication topologies. This implementation will allow the Data Protection Level (DPL) requested by the user for the data portion of the object to be maintained over the total replication topology and not per each system involved. This will provide the same data availability and security for each system but substantial savings in storage utilization for the whole replication topology.

The object lifecycle begins as usual. The user will store data on the system and create whatever metadata is needed and frequently used. The system will queue the object for replication according to rules defined for the object. Since the object possesses new intelligence regarding which part is needed on the other end of the replication link, only this part is going to be sent to the replica. If the replica system is defined as Metadata Only in the storage policy, only the metadata portion of the object is going to be sent. This will potentially save both bandwidth and storage capacity on the target system. The user on the replica system will have full access to both the data and metadata portions of the object, but metadata is going to be stored locally on the replica and data is going to be accessible over the replication link. Since in the majority of cases, metadata is sufficient for the application, user requests will be served without any additional data transfers.

Case 2: Storage Tier Is Defined As An NFS Share

The object lifecycle begins when the object is stored in the system. Then the user could create some metadata that the user needs and uses regularly. After the metadata is created, the object data becomes redundant since the user is interested in metadata only.

If the system administrator allows migration of data portion of the object to the NFS share, the system will move the data part off the content platform (e.g., HCP) low latency hardware to the cheaper NFS share with higher latency. This will allow for better utilization of costly and valuable storage without affecting the user experience or data protection and security. The user will continue to have access to the object metadata at the same speed. If the user needs the data portion of the object, the system will retrieve it and service the request with slight delay but the process will be completely transparent to the user. The same Data Protection Level (DPL) level and data consistency will be maintained throughout the object lifecycle.

Of course, the system configurations illustrated in FIGS. 1 and 4 are purely exemplary of systems including content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing a mechanism called content classes to define a blueprint that will construct structure to the unstructured content of an object and its metadata and to facilitate efficient indexing and searching. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system coupled to another storage system comprising:
   one or more storage devices which store data of a first object, the first object having a first content data and a first metadata; and
   a processor being configured to:
   replicate the first object to the another storage system;
   when a policy applied to the first object in the storage system is metadata only, the metadata only policy requiring that the first metadata of the first object should be stored in the storage system without requiring that the first content data also be stored in the storage system, the processor being further configured to:
   verify that replicated first content data of the replicated first object is stored in the another storage system;
   verify that the another storage system has not been requested to store replicated first metadata without the replicated first content data; and
   after verifying that both the replicated first content data of the replicated first object is stored in the another storage system and that the another storage system has not been requested to store the replicated first metadata without the replicated first content data, mark the first content data of the first object to be deleted from the one or more storage devices.

2. A storage system according to claim 1, wherein the processor is further configured to record a location of the replicated first content data in the another storage system.

3. A storage system according to claim 1,
   wherein after a first amount of time has elapsed after ingest of the first object to the storage system, the processor is further configured to verify that the replicated first content data is stored in the another storage system and the another storage system has not been requested to store the replicated first metadata without the replicated first content data.

4. A storage system according to claim 1,
   wherein the processor is further configured to delete the marked first content data from the one or more storage devices.

5. A storage system according to claim 4,
   wherein the processor is further configured to, upon receipt of a read request of the first content data, obtain the replicated first content data from the another storage system and keep the obtained replicated first content data for a second amount of time.

6. A storage system according to claim 5,
   wherein the processor is further configured to delete the obtained replicated first content data from the one or more storage devices after the second amount of time has elapsed.

7. A storage system according to claim 4,
   wherein the processor is further configured to, upon receipt of a read request of the first metadata, return the first metadata stored in the one or more storage devices without accessing to the another storage system.

8. A storage system according to claim 1,
   wherein the one or more storage devices store data of a second object, the second object having a second content data and a second metadata,
   wherein the processor is configured to replicate the second object to the another storage system, and
   wherein when a policy applied to the second object in the another storage system is metadata only, the processor being further configured to:
   send the second metadata to the another storage system without sending the second content data after:
   verify that the another storage system has been requested to store replicated second metadata without the second content data; and
   verify that the storage system has not been requested to apply a metadata only policy to the second object in the storage system.

9. A storage system according to claim 8,
   wherein the processor is further configured to send the second metadata with location information of the second data content in the storage system.

10. A storage system according to claim 8,
    wherein after a first amount of time has elapsed after ingest of the second object to the storage system, the processor is further configured to verify that the another storage system has been requested to store replicated second metadata without the second content data.

11. A method according to claim 1 further comprising:
recording a location of the replicated first content data in the another storage system.

12. A method according to claim 1, further comprising:
    verifying, after first amount of time has elapsed after ingest of the first object to the storage system, that the replicated first content data is stored in the another storage system and that the another storage system has not been requested to store the replicated first metadata without the replicated first content data.

13. A method according to claim 1, further comprising:
deleting the marked first content data from the one or more storage devices.

14. A method according to claim 13, further comprising:
obtaining, upon receipt of read request of the first content data, the replicated first content data from the another storage system and keeping the obtained replicated first content data for a second amount of time.

15. A method according to claim 14, further comprising:
deleting the obtained replicated first content data from the one or more storage devices after the second amount of time has elapsed.

16. A method according to claim 13, further comprising:
returning, in receipt of a read request of the first metadata, the first metadata stored in the one or more storage devices without accessing to the another storage system.

17. A method for a storage system coupled to another storage system, the method comprising:
managing data of a first object stored in the storage system, the first object having a first content data and a first metadata;
replicating the first object to the another storage system;
when a policy applied to the first object in the storage system is metadata only, the metadata only policy requiring that the first metadata of the first object should be stored in the storage system without requiring that the first content data also be stored in the storage system, whereby the first content data can be deleted according to the metadata only policy, the method further comprising:
verifying that replicated first content data of the replicated first object is stored in the another storage system;
verifying that the another storage system has not been requested to store only replicated first metadata without the replicated first content data; and
after verifying that both the replicated first content data of the replicated first object is stored in the another storage system and that the another storage system has not been requested to store only replicated first metadata without the replicated first content data, marking the first content data of the first object to be deleted from the one or more storage devices.

18. A method according to claim 17, further comprising:
managing data of a second object, the second object having a second content data and a second metadata, and
when a policy applied to the second object in the another storage system is metadata only, sending the second metadata to the another storage system without sending the second content data after:
verifying that the another storage system has been requested to store replicated second metadata without the second content data; and
verifying that the storage system has not been requested to apply a metadata only policy to the second object in the storage system.

19. A method according to claim 18, further comprising:
sending the second metadata with location information of the second data content in the storage system.

20. A method according to claim 18, further comprising:
verifying, after a first amount of time has elapsed after ingest of the second object to the storage system, that the another storage system has been requested to store replicated second metadata without the second content data.

* * * * *